July 20, 1926.                                                    1,593,005
                         C. A. BAILEY
                        AUTOMOBILE BODY
                      Filed March 1, 1926        2 Sheets-Sheet 1
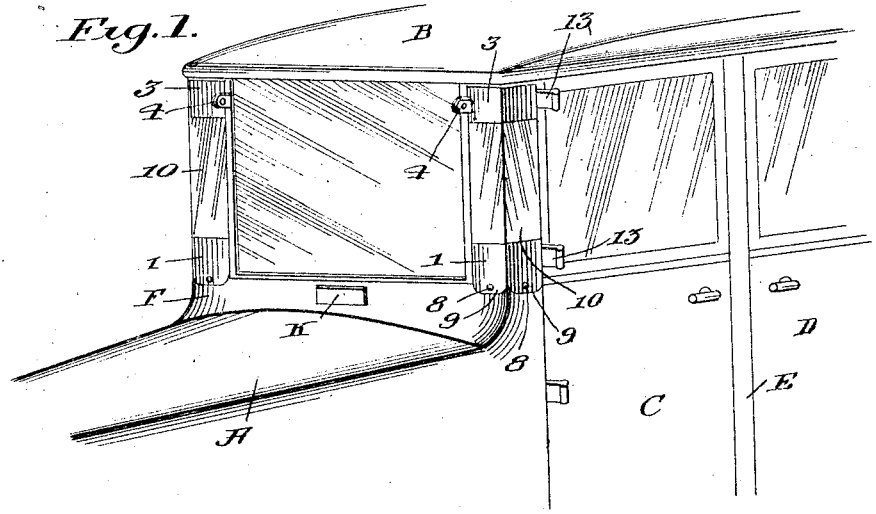
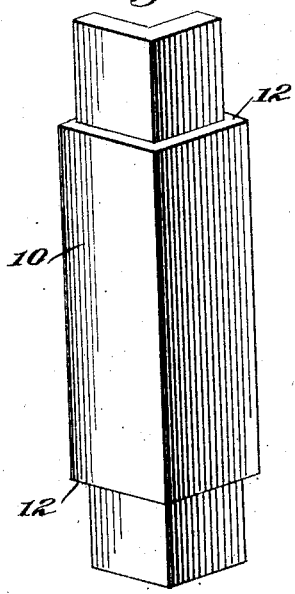
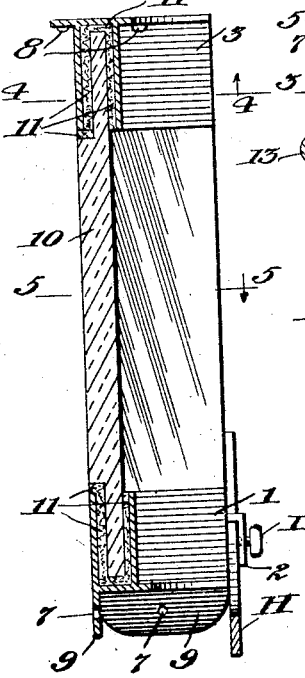
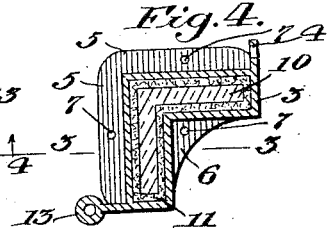
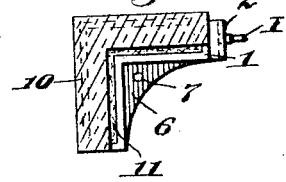
Inventor:
Carl A. Bailey,
by Richard E. Babcock
                Att'y.

July 20, 1926.
C. A. BAILEY
1,593,005
AUTOMOBILE BODY
Filed March , 1926   2 Sheets-Sheet 2
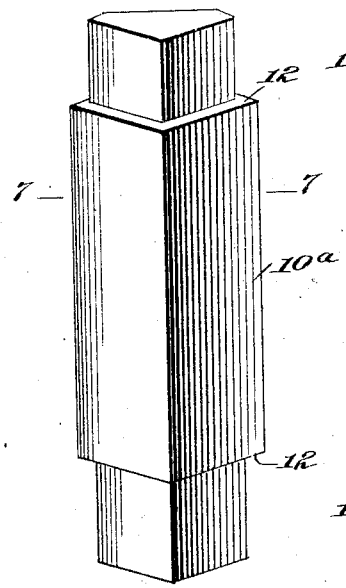
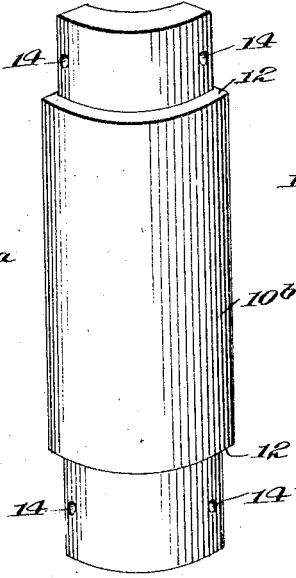
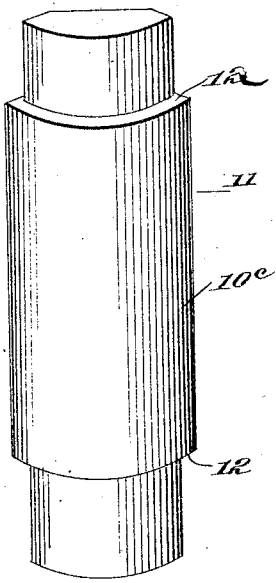
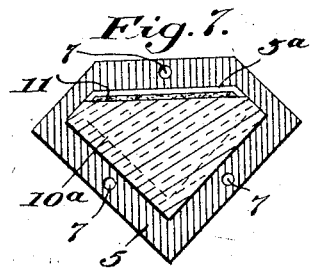
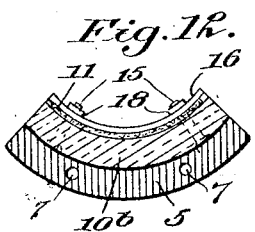
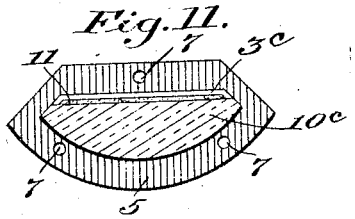
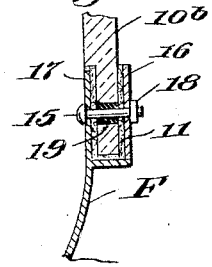
Inventor.
Carl A. Bailey,
by Richard E. Babcock
Atty.

Patented July 20, 1926.

1,593,005

UNITED STATES PATENT OFFICE.

CARL A. BAILEY, OF LISBON FALLS, MAINE.

AUTOMOBILE BODY.

Application filed March 1, 1926. Serial No. 91,480.

This invention relates to automobile bodies, and more particularly to the front corner or post construction of closed car bodies.

Its primary object is to eliminate the "blind spots" or "blind areas" so called, that is, to give the driver full vision both straight ahead and obliquely ahead on either side in the field of vision otherwise intercepted and obstructed by the present usual solid metal or wooden front corner posts of the car body.

Further objects are to avoid weakening the body, to provide for easy replacement, to provide means for supporting the upper portions of the front doors if desired, and to prevent rattling and vibration.

In the accompanying drawings:

Figure 1 represents a perspective view of a portion of a closed automobile body embodying my invention;

Figure 2, a perspective view of the transparent post used at each front corner of the body and constituting the essential feature of my invention, broadly considered;

Figure 3, a sectional view on line 3—3 of Fig. 4;

Figure 4, a sectional view on the line 4—4 of Fig. 3, looking upward in the direction of the arrow;

Figure 5, a sectional view on the line 5—5 of Fig. 3, looking downward in the direction of the arrow;

Figure 6, a view similar to Fig. 2 of a modification wherein the transparent portion or post is triangular, or substantially triangular, and solid in cross-section;

Figure 7, a cross-sectional view on the line 7—7 of Fig. 6, looking toward the top socket 3$^a$ with said socket 3$^a$ thereon;

Figure 8, a view similar to Fig. 6 of a further modification wherein the transparent post is arcuate in cross-section, and wherein the front, bottom and ends of the sockets will be integral with the cowl and with the top respectively of the body or welded thereto, and the rear plate of the sockets will be separate and removable and bolts will be used passing through the front and rear plates of the respective sockets and through holes in the intervening transparent post material to hold the transparent posts in place, preferably suitable cushioning material being arranged about the bolts and between the sockets and the glass or other transparent material of the posts to prevent direct contact between said posts and said bolts and sockets;

Figure 9, a fragmentary vertical sectional view taken on a vertical line through one end of the modified form of post of Figure 8 intersecting one of the bolt holes 14 thereof, said post being seated in its socket shown in section and broken away;

Figure 10, a view similar to Fig. 8, of a further modified form of transparent post arcuate on its outer face and straight on its inner face;

Figure 11, a cross-sectional view on line 11 of Fig. 10, looking in the direction of the arrow and showing the top socket 3$^c$ receiving the said post; and Figure 12, a view similar to Figures 7 and 11 of a further modification very similar to that of Figures 8 and 9, the only difference between them being that both parts of the sockets 3$^b$ are separate from the body of the car and are secured thereto in proper position and relation by means of bolts, screws, rivets or the like as preferred.

Heretofore there has been much objection particularly to closed cars because the driver could not see obliquely ahead on account of the obstruction to his vision by the front corner posts, so that he could not see traffic coming out of a side street, or a person stepping into his path so long as said traffic or person was in the field obstructed by the corner posts, which, in view of the bulk and nearness of the posts, particularly the left post, to the eyes of the driver, comprised a relatively large area obliquely ahead. This has been a generally recognized defect, commonly referred to as blind spots or blind areas, and various efforts to solve the problem have been made, but the automobile world is still seeking a practical answer to this problem.

I seek to cure the difficulty by providing transparent colorless or substantially colorless, or preferably colorless front corner posts, such as glass, preferably of a malleable or tough or non-breakable or flexible or semi-flexible nature, or any other suitable transparent preferably colorless or substantially colorless material preferably having a high degree of resistance to strains, twists, ends strains and thrusts and sudden jerks and jars, the essential point being that through it, or a substantial vertical portion of it, the driver may have full unhampered vision in a transverse direction from extreme edge to extreme edge of the post.

My invention further contemplates any suitable means combining with said transparent post element to suitably secure the same in position; and further, preferably, the combination of said post element and said securing means with the body in such manner that the said post will function in supporting and holding the top substantially in the same manner as the present wooden or metal posts.

My invention further contemplates details whereby the means of mounting said posts will cooperate with the wind-shield and front doors to pivotally support said wind-shield and to provide for its adjustment, and whereby the upper portions of the front doors will be hingedly mounted on the upper sockets for said posts.

Referring now in detail to the drawings, B designates the roof or top of the body, A the hood of the car, C one of the side front doors, D one of the rear side doors, E the middle supporting post or panel, F the cowl, and G the usual one-piece wind-shield now in extensive use and operated by usual means, for instance, an arcuate arm H extending from the lower part of one side of the wind-shield frame and clamped in usual manner between strap 2 of the lower socket 1 and said lower socket 1 by a clamping screw I working through said strap 2, said frame being hinged or pivotally mounted as usual in brackets 4 which may be integral with the upper sockets 3.

K designates the usual cowl ventilator.

The upper sockets 3 will preferably be provided with horizontal outer webs 5 and an inner web 6, all of said webs being formed with perforations 7 to receive bolts, screws or similar fastenings 8 to firmly secure said sockets, preferably detachably, to the top or roof B of the body.

The lower sockets 1 will preferably be provided each with the horizontal perforated web 6, and with depending perforated webs or flanges 9 to receive screws, bolts or similar fastenings 8 passing through said webs and into or through the adjacent portion of the cowl F or other supporting structure to secure said lower sockets firmly thereto.

The transparent preferably colorless or substantially colorless post elements 10 preferably have their upper and lower end portions of reduced thickness and width so that the front and sides of each element 10 will be flush with the outer and side or end faces of its sockets 1 and 3, cushioning 11, of any suitable material, such as rubber, felt, or several layers of rubber and felt, or some composite material, being preferably interposed between the shoulders 12, formed by such cutting away, and the opposed edges of the sockets 1 and 3, and also at all points between the reduced portions of the transparent post elements and said sockets to cushion said posts and avoid unpleasant rattle and vibration.

Thus it will be seen that there is no obstruction to vision between the front frame member of the front door, and the side of the wind-shield, which need not have a frame extending about its bottom and side edges, or but partially down the side edges from the top, or may have the frame extending entirely around the glass of the wind-shield, as shown, so that nowhere between said front door and the adjacent side of the wind-shield is there any object in any way interfering with the driver's vision, so that by this construction the driver is given full unobstructed vision obliquely ahead.

In order that the front door C may be hingedly supported for substantially its full length I provide the upper and lower sockets 3 and 1 respectively with hinge members 13, which may be integral with said sockets, or fastened thereto in any suitable manner as desired, and to which the cooperating hinge elements secured to the door may be pivotally connected, in the same manner as is now usual with the usual wooden or metal front corner post construction.

In the modified form illustrated in Figures 6 and 7, the construction, assembly and operation are the same as in the preferred form above described, except that the transparent post 10$^a$ is solid or prismatic and substantially triangular in cross-section, the side and rear corners being squared off to avoid a sharp edge, the sockets corresponding in form, as illustrated in Figure 7, as to upper socket 3$^a$.

In the modification illustrated in Figures 8 and 9 the transparent preferably colorless post 10$^b$ may be arcuate in cross-section as shown, and is provided in its reduced end portions with perforations 14 to receive fastening bolts 15 passing through the inner removable plate 16, the rigid plate 17, the cushioning material 11 and the intervening material of the post 10$^b$ and receiving cooperating nuts 18.

The rigid outer plate 17 will preferably be integral with the cowl F as shown, or the top or roof B of the car, as the case may be, and preferably will embody also the horizontal web or portion of the socket opposed to the corresponding end edge of the post 10$^b$ and also the ends or sides of the sockets opposed to the vertical edges of said post 10$^b$, and a sleeve 19 of cushioning material, such as that mentioned with relation to cushioning material 11, will be arranged about the respective bolts 15 to prevent direct contact between said bolts and said post 10$^b$.

With this construction, in case of need for replacement, it suffices to remove the inner plates 16 in a horizontal plane, remove the damaged post 10ᵇ, fit the new post 10ᵇ in position, replace the inner plates 16 and cushioning material, and apply and tighten up the nuts 18 on the respective bolts 15, with no need to entirely remove each socket, as in the preferred form.

The construction of this type of modified form is not to be understood as limited to the arcuate post 10ᵇ illustrated, but may be embodied in an assemblage wherein the post is of the form shown in Fig. 2, or of the forms shown in Figures 6 or 10, or of any other suitable form, the various forms of posts herein illustrated being merely by way of example and not by way of limitation.

Further, while preferred, it is not essential that the front plate 17 of the sockets be integral with the top and cowl respectively of the body, but on the contrary they may be separate therefrom, being secured thereto substantially as are the sockets of the preferred form, as illustrated in Figure 12, which modified form is in all other respects the same as the modification shown in Figures 8 and 9 and above described.

In the modification illustrated in Figures 10 and 11 the construction, assembly and operation will be in all respects the same as in the preferred form, except that the transparent posts 10ᶜ will be solid and substantially arcuate in cross-section, the side and rear edges being squared off to avoid a sharp edge and the sockets corresponding in form as illustrated in Figure 11 as to the upper socket 3ᶜ.

Having thus described my invention, what I claim as new and desire to secure by Letters Patent is:

1. In a closed automobile body, a transparent substantially colorless front corner post, and means for securing said post in position.

2. In a closed automobile body, a downwardly presented socket provided at the front corner of the top of the body, and an upwardly presented socket provided at the front corner of the cowl and vertically in registry with said upper opposed socket, in combination with a transparent corner post having its end portions respectively received in said sockets.

3. In a closed automobile body, a downwardly presented socket provided at the front corner of the top of the body, and an upwardly presented socket provided at the front corner of the cowl and vertically in registry with said upper opposed socket, in combination with a transparent corner post having its end portions respectively received in said sockets, said sockets being provided with hinge elements for the mounting of a third element.

4. In a closed automobile body, a downwardly presented socket rigid with the roof of the body, an upwardly presented socket rigid with said body and vertically in registry with, and below, the opposed downwardly presented socket, and a transparent substantially colorless post having its respective end portions received in the respective sockets, in combination with a door, hinge members carried by said door, and hinge members carried by said sockets and respectively cooperating with said door hinge members.

5. In a closed automobile body, a downwardly presented socket provided at the front corner of the top of the body, an upwardly presented socket provided at the front corner of the cowl and vertically in registry with said upper opposed socket, and a transparent corner post having its end portions respectively received in said sockets, in combination with a wind shield, and means carried by said wind-shield and said upper socket for pivotally mounting one end of said wind-shield to swing in a vertical direction with relation to said means.

6. In a closed automobile body, a downwardly presented socket provided at the front upper corner of the top of the body, an upwardly presented socket provided at the front corner of the cowl and vertically in registry with said upper opposed socket, and a transparent corner post having its end portions respectively received in said sockets, in combination with a wind-shield, and cooperating means carried by said windshield and said lower socket for locking said wind-shield in any desired position of adjustment.

7. In a closed automobile body, a downwardly presented socket carried by the top of the body, an upwardly presented socket carried by said body and vertically in registry with, and below, the opposed downwardly presented socket, and a transparent substantially colorless post having its respective end portions received in the respective sockets, in combination with a door, a hinge member carried by said door, and a hinge member carried by one of said sockets and cooperating with said door hinge member.

8. In a closed automobile body, a vertically disposed opposed pair of sockets provided at each front corner of the body and fixed with relation thereto, and a transparent substantially colorless corner post having its end portions received in the respective sockets of said pairs of sockets respectively, in combination with a windshield interposed between said pairs of sockets, a door, means provided on said windshield and the upper sockets of said pairs of sockets for pivotally mounting said windshield to swing in a vertical direction, and one of said upper sockets and said door being provided with cooperating hinge means for hingedly mounting said door to swing in a horizontal plane.

9. In a closed automobile body, a windshield, and a door, in combination with a post extending over the full area between said door and wind-shield and having a portion transparent and substantially colorless, said portion extending transversely from extreme edge to extreme edge of said post.

In testimony whereof, I have signed my name to this specification at Lisbon Falls, Maine, this 26th day of February 1926.

CARL A. BAILEY